United States Patent

[11] 3,632,199

[72] Inventor Gary E. Peterson
      Sun Valley, Calif.
[21] Appl. No. 865,149
[22] Filed Oct. 9, 1969
[45] Patented Jan. 4, 1972
[73] Assignee Gerald J. Frey

[54] AUTOMATIC SLIDE-CHANGING MECHANISM
      9 Claims, 1 Drawing Fig.
[52] U.S. Cl. ............................................. 353/103,
                              307/252 J, 307/293, 323/22 SC
[51] Int. Cl. ..................................................... G03b 23/00,
                                                                H03k 17/26
[50] Field of Search ........................................... 323/22 SC;
                              353/15, 103; 318/443, 444

[56]                    References Cited
                   UNITED STATES PATENTS
3,170,369    2/1965    Frey et al. ..................... 353/109 UX
3,244,965    4/1966    Gutzwiller ..................... 323/22 SC
3,335,352    8/1967    Neapolitakis ................... 318/443

3,498,703    3/1970    Gerry ........................... 353/15
                   FOREIGN PATENTS
212,203     6/1957     Australia ....................... 353/103

Primary Examiner—Leonard Forman
Assistant Examiner—Steven L. Stephan
Attorney—Fulwider, Patton, Rieber, Lee & Utecht ABSTRACT: A slide-changing mechanism for use in a photographic slide projector and including an electric motor for changing slides under both manual and timed automatic control. Manual control is effected by a switch which energizes the motor for rotation in a selected direction for one cycle that is terminated by a switch opened by a cam turned by the motor, and automatic control is effected by a silicon-controlled rectifier triggered by a relaxation oscillator circuit including a potentiometer for varying the rate of charge of a timing capacitor in the circuit. The cam-operated switch controls the power supply of the timing circuit to disconnect the circuit during changing of slides, and resets the circuit substantially to initial conditions preparatory to timing the next interval.

PATENTED JAN 4 1972
3,632,199
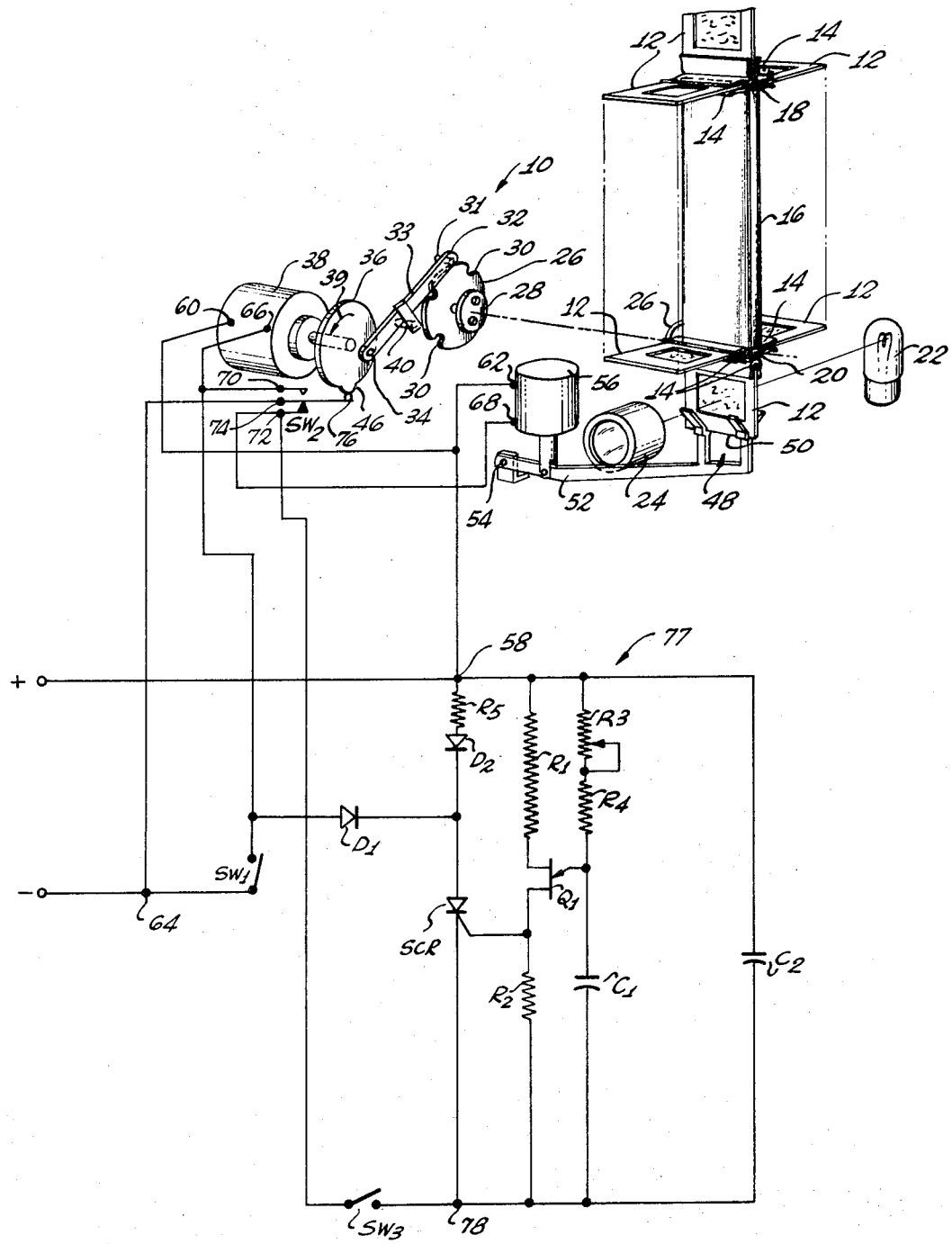
INVENTOR.
GARY E. PETERSON
BY Fulwider, Patton, Rieber
Lee, and Utecht
ATTORNEYS

AUTOMATIC SLIDE-CHANGING MECHANISM

BACKGROUND OF THE INVENTION

This invention relates generally to slide-changing mechanisms for slide projectors, and more particularly to an automatic slide-changing mechanism including an automatic timer for controlling successive timed intervals between slide changes.

In the course of the development of photographic slide projectors, mainly those for use in the home, the changing of the slide in the projector has been partially automated by utilizing mechanisms driven by electric motors. To provide for the automatic changing of a slide after a preset viewing time, in addition to the usual manual actuation of slide changes, automatic timers have been incorporated in such slide projectors to activate the slide-changing mechanism periodically after dwell periods of selected length. Heretofore, the best of the automatic timers have principally employed thermoelectrically actuated time-delay switches.

However, the adjustment and operation of a thermoelectrically operated timing device has been somewhat unreliable in that it is largely dependent upon mechanical construction tolerances and is sensitive to heat variations in and around the projector. Additionally, such thermoelectric timing devices require numerous relatively complex, interconnected mechanical elements which must be built into the slide projector, so that such devices have been relatively expensive to construct and install.

SUMMARY OF THE INVENTION

The present invention resides in an automatic timer for a slide projector in which the components of a manually actuated slide-changing mechanism are combined in a novel manner with simple and inexpensive electronic components to produce an automatic timer that is highly effective, easily adjustable as to the timed dwell interval between slide changes, and very compact in construction, primarily as a result of the dual utilization of components of the manually actuated mechanism. More specifically, the preferred embodiment of the automatic timer includes a motor-driven cam and cam-operated switch for terminating operation of a slide-changing motor at the end of each cycle, a silicon-controlled rectifier in parallel with the motor switch for effecting manual starting of the motor, and a relaxation oscillator circuit for triggering the controlled rectifier periodically, after a selected and adjustable dwell, to energize the slide-changing motor for a cycle that is terminated by the cam-operated switch. The cam-operated switch controls the power applied to the relaxation oscillator circuit as well as the length of the slide-changing cycle, and makes it possible to utilize an extremely simple timing circuit to perform the timing and adjustment functions that heretofore required much more complex and expensive timing components.

BRIEF DESCRIPTION OF THE DRAWING

The drawing shows a partially exploded, pictorial, mechanical view of the basic parts of the slide-changing mechanism of a slide projector together with an electrical schematic diagram of the control circuit, the mechanism and circuit being combined in accordance with the present invention.

DETAILED DESCRIPTION

The preferred embodiment of the timing circuit of the present invention is particularly adapted for use with a slide-changing mechanism 10 for a slide projector such as that shown in the drawing. The illustrated mechanism 10 is basically of a type described in U.S. Pat. No. 3,170,369 entitled SLIDE PROJECTOR, issued on Feb. 23, 1965, to G. J. Frey et al., to which reference is made for details of construction and operation not contained herein.

To aid in understanding the present invention, however, the basic operation of the slide-changing mechanism 10 will be briefly described. Generally, the slide projector utilizes a slide magazine (not shown) in which individual slides 12 are mounted in clips 14 on an endless belt 16 which travels around spaced upper and lower shafts 18, 20 set in the magazine. The magazine is removably mounted on the slide projector so that a depending slide 12 is brought into position for projection between a lamp 22 and a lens assembly 24 each time the belt is advanced one step through a preselected increment of feed.

In the illustrated slide-changing mechanism 10, the lower shaft 20 is driven by a drive wheel 26 through a clutch assembly 28. The drive wheel 26 has four notches 30 equally spaced about its periphery to be engaged by a pin 31 on the free end portion 32 of a drive arm 33. The opposite end 34 of the drive arm is pivotally connected to the periphery of a crank disc 36 driven by an electric motor 38 that preferably is reversible to provide for reversible feeding of the slides 12.

The electrical control for the mechanism 10 is such that the slide-changing cycle can be started by momentarily depressing a manual slide-change switch $SW_1$ which starts the motor 38. As the crank disc 36 is rotated by the motor 38, in the direction indicated by the arrow 39, drive arm 33 slides along a guide 40 so that the free end 32 of the arm first moves to the right, over and above the periphery of the drive wheel 26, and then pivots about the guide to drop the pin into engagement with the notch 30 positioned near the top of the wheel. A suitable spring (not shown) holds the arm in sliding engagement with the guide 40 at all times.

As the crank disc 36 continues to rotate, the pin 31 is shifted back to the left to turn the drive wheel 26 through a preselected arc, herein 90°, to advance the belt a corresponding amount and move a new slide 12 into the projection position at the bottom of the magazine. As the crank disc 36 completes one revolution, the pin 31 is lifted out of the notch 30 to disengage the arm 33 from the wheel. A cam 46 on the periphery of the disc 36 cooperates with a cam-operated switch $SW_2$ to deenergize and stop the motor 38 as each slide change is completed.

To position each slide 12 positively for projection, a fork 48 is provided to engage a lower edge 50 of the slide from below, and press the slide firmly against the lower shaft 14. The positioning fork is on the end of an arm 52 carried on a pivot 54 at its other end, and swings upward into locking engagement with a slide 12 when the arm is raised by a solenoid 56. During the slide-changing cycle, the solenoid 56 is deenergized and the arm 52 thus is lowered to hold the fork out of engagement with the slides. When a new slide is in the projection position, the solenoid is energized to raise the fork into positioning engagement with the slide. The motor 38 and solenoid 56 of the illustrated slide-changing mechanism 10 are operated from a suitable DC power supply preferably derived from a 115 volt AC utility line by means of the usual stepdown transformer and rectifier-filter combination (not shown).

In the control circuit for manual operation, a positive side 58 of the power supply is connected to both a positive terminal 60 of the motor 38 and one terminal 62 of the solenoid 56. A negative side 64 of the power supply is connectable alternately to a negative terminal 66 of the motor 38 and to another terminal 68 of the solenoid 56 by means of the cam switch $SW_2$, which herein is a single-pole, double-throw switch. The motor and solenoid terminals 66 and 68 are connected to respective first and second outer contacts 70 and 72 of switch $SW_2$ for alternate engagement with the center contact 74 of the switch.

The center contact 74 is connected to the negative side 64 of the power supply, and the position of the center contact is determined by a cam follower 76 which is positioned beside the periphery of the crank disc 36, herein at the bottom thereof. In the dwell position of the disc 36, the cam 46, which is a lobe on the periphery of the disc, engages the follower 76 and holds the center contact 74 of the cam switch $SW_2$ in contact with the switch contact 72 connected to the solenoid terminal 68, energizing the solenoid 56 to move the positioning fork 48 upwardly into the raised position. During the slide-changing cycle, the cam lobe 46 moves away from the follower 76 and the center contact 74 moves away from switch contact 72 to deenergize the solenoid and lower the fork.

A single-pole, single-throw switch, preferably of the pushbutton, momentary-contact type, serves as the manual slide-change switch $SW_1$ and is connected between the negative side 64 of the powerline and the negative terminal 66 of the motor 38. When it is desired to change a slide 12, the manual switch $SW_1$ is momentarily depressed, connecting the motor 38 across the power supply terminals 58 and 64. As the motor 38 begins to turn, the cam lobe 46 moves out of engagement with the follower 76 to deenergize the solenoid 56, the center contact moving into engagement with the alternate contact 70 of switch $SW_2$. The motor 38 then is connected to the negative side 64 of the power supply around the manual switch $SW_1$ while the disc 36 is making one complete revolution. When the cam lobe 46 returns to the position shown in the drawing, the cam follower 76 is shifted radially outward, disconnecting the motor from the power supply by opening contacts 70 and 74, and simultaneously closing contacts 72 and 74 to energize the solenoid 56 and raise the positioning fork 48.

Thus, the manual operation of the slide-changing mechanism 10 is such that, when the manual switch $SW_1$ is momentarily depressed, the solenoid 56 is deenergized to pivot the positioning fork 48 out of engagement and the motor 38 is connected to the power supply independently of the manual switch. The motor 38 then drives the slide-changing mechanism 10 to move another slide 12 into position. Thereafter, the motor 38 is disconnected from the power supply and the solenoid 56 reconnected to pivot the fork 48 into positioning engagement with the new slide 12.

It will be seen that the operation of the cam switch $SW_2$ is exactly the same regardless of the direction of rotation of the crank disc 36. Therefore, provision may be made for reversing the direction of movement of the slides 12 by simply reversing the polarity of the voltages applied to the motor 38. This may be accomplished simply by providing a polarity reversing switch (not shown) for the motor 38.

In accordance with the present invention, the slide-changing mechanism 10 and the associated control components are combined in a novel manner with a timing control circuit, indicated generally at 77, for automatic control of the dwell time between successive, automatically initiated slide-changing cycles, and to permit selective and rapid adjustment of the length of the cycle within a relatively wide range, all with conventional, relatively inexpensive components that may be assembled and installed as a very compact and reliable control unit. The existing control components previously described in connection with the manual operation of the slide-changing mechanism are utilized in the automatic timer as well, the cam 46 and the cam-operated switch $SW_2$ serving to initiate the timing cycle as the cam moves into the dwell position shown in the drawing, to reset the circuit during each automatic slide-changing operation, and to initiate successive, timed dwell periods after successive slide changes.

To these ends, the automatic timer utilizes a silicon-controlled rectifier SCR which is essentially connected in parallel with the manual slide-change switch $SW_1$ and serves the same function during automatic operation as does switch $SW_1$ during manual operation. Timed triggering of the controlled rectifier SCR is provided by a unijunction transistor, relaxation oscillator circuit which includes a potentiometer for adjustment of the timed dwell period for the slide projector by controlling the rate of change of a timing capacitor $C_1$. The controlled rectifier SCR and triggering relaxation oscillator circuit are interconnected with the cam-operated switch $SW_2$ so that the normal switching operation of switch $SW_2$ controls the power applied to the controlled rectifier SCR and oscillator to initiate timed dwell periods and reset the timing control circuit. The automatic timer is selectively connected to the slide-changing mechanism 10 by means of a manually operable on-off switch $SW_3$.

It will be evident that the timing cycle takes place while the motor 38 and the crank disc 36 are at rest with the cam lobe 46 in engagement with the follower 76, the belt 16 thus remaining stationary with a slide 12 in the projection position as shown in the drawing. The controlled rectifier SCR is triggered, after the selected dwell interval, by the relaxation oscillator, thereby creating a conducting path between the negative terminal 66 of the motor 38 and the negative side 64 of the power supply, turning the motor on to begin the slide-changing cycle. The conducting path is through a diode $D_1$, the anode-cathode circuit of the controlled rectifier SCR, the on-off switch $SW_3$ and the second and center contacts 72 and 74 of the cam switch $SW_2$ to the negative side 64 of the power supply.

When the motor 38 starts, the crank disc 36 turns the cam lobe 46 away from the follower 76, and the center contact 74 of the cam switch $SW_2$ is disconnected from the second contact 72, thereby disconnecting the cathode of the controlled rectifier SCR, as well as the solenoid 56, from the negative side 64 of the power supply. The cathode of the controlled rectifier and the common point 78 of the timing circuit are then connected to the positive side 58 of the power supply through the relatively low electrical impedance of the coil of the solenoid 56. The rectifier SCR and the relaxation oscillator circuit are then effectively short-circuited through the solenoid coil to commutate the rectifier SCR and discharge the components of the relaxation oscillator circuit to an initial condition of substantially 0 volts. A capacitor $C_2$ is provided across the timing circuit to aid in maintaining a steady direct-current voltage during both the timing and slide-changing periods as well as to filter out any remaining alternating current voltages in the power supply.

The controlled rectifier SCR and oscillator remain connected across the solenoid coil, without power, throughout the slide-changing cycle, thereby preventing the normal, free running operation of the relaxation oscillator circuit. It will be seen, therefore, that the incorporation of the existing switching components of the mechanism 10 in the timing circuit of the present invention permits the use of a relatively simple controlled-switch circuit to provide for automatic operation of the mechanism.

As the slide-changing cycle is completed, the cam lobe 46 on the crank disc 36 moves the cam follower 76 back into the dwell position shown in the drawing, and thus connects the solenoid 56 and timing circuit to the negative side 64 of the power supply and, concurrently, disconnects the motor 38 from the power supply. The cam lobe 48 thus moves the cam follower 76 into position for projecting a slide 12.

Herein, the unijunction transistor relaxation oscillator circuit has a resistor $R_1$ connected between the positive side 58 of the power supply and base-two of the unijunction transistor $Q_1$. A second resistor $R_2$ is connected between base-one of the unijunction transistor and the common point 78 for the timing circuit at the cathode of the controlled rectifier SCR. In the usual manner, the gate electrode of the controlled rectifier SCR is connected to the junction of base-one of the unijunction transistor $Q_1$ and to the resistor $R_2$. One end of a linear potentiometer $R_3$ is connected to the positive side 58 of the power supply and the center tap and the other end of the potentiometer are connected through a resistor $R_4$ to the emitter of the unijunction transistor $Q_1$. The timing capacitor $C_1$ is connected between the emitter of the unijunction transistor $Q_1$ and the common point 78.

The relaxation oscillator circuit functions in the usual manner in that the resistors $R_1$ and $R_2$ provide a bias potential between the base-one and the base-two of the unijunction transistor $Q_1$. Potentiometer $R_3$, resistor $R_4$ and capacitor $C_1$ form a charging circuit which provides a substantially linear voltage buildup across capacitor $C_1$ until the voltage between the emitter and the base-one of the unijunction transistor $Q_1$ reaches the threshold point determined by the intrinsic standoff ratio and the bias voltage for the unijunction transistor. The unijunction transistor then fires, developing a voltage pulse across resistor $R_2$ which triggers the controlled rectifier SCR to start the motor 38.

To vary the length of the timed interval, the length of time required for the voltage buildup is varied by adjusting the potentiometer $R_3$, and thereby changing the rate of charging of the timing capacitor $C_1$. By reducing the charging rate, the interval is increased, and by increasing the rate, the interval is reduced. With the illustrated embodiment, it has been found that the viewing time for a slide can be varied conveniently between about 2 and 60 seconds.

A current-hold network is provided to prevent commutation, or turning off, of the controlled rectifier SCR because of circuit interruptions due to the commutator of the motor. In the present instance, this network comprises a resistor $R_5$ connected in series with a diode $D_2$ between the positive side 58 of the power supply and the anode of the controlled rectifier SCR. Thus, when the controlled rectifier fires, a small holding current is provided through resistor $R_5$ and diode $D_2$ to maintain the controlled rectifier in an "ON" condition regardless of the intermittent currents through the motor 38.

It should be noted that, even though the on-off switch $SW_3$ for the timing circuit has been closed to initiate timed automatic operation, the manual switch $SW_1$ remains effective to initiate a slide change during the timing of a selected interval by the timing circuit. Upon manual closure of switch $SW_1$, the motor 38 is immediately energized to start its slide-changing cycle, terminating the partially timed interval and preparing the circuit for timing of the next interval when a new slide is in the projection position.

Typical component values for the timing circuit and associated elements are:

| Power supply | 24 volts DC |
| --- | --- |
| Motor | 24 volts DC motor for developing a cam and disc angular velocity of approximately 30 r.p.m. |
| Solenoid | 24 volt DC solenoid |
| $Q_1$ | 2N4871 |
| SCR | 2N5060 |
| $D_1$ | 1N4001 |
| $D_2$ | 1N4001 |
| $C_1$ | 50 microfarads 50 volts |
| $C_2$ | 50 microfarads 50 volts |
| $R_1$ | 560 ohms |
| $R_2$ | 27 ohms |
| $R_3$ | 1 megohm linear potentiometer |
| $R_4$ | 33 K |
| $R_5$ | 1,000 ohms |

From the foregoing, it will be seen that the present invention combines a slide-changing mechanism of the general type disclosed in the aforesaid patent with a timing circuit of conventional form, and interrelates the elements of the mechanism and of the circuit to produce a novel automatic time for a slide projector, the timer being simple, compact and inexpensive in construction and highly effective and reliable in operation. While a particular preferred embodiment of the timing circuit has been described and illustrated for use with a particular motor-driven slide-changing mechanism 10, it will be appreciated that many variations and modifications are within the spirit and scope of the invention.

I claim as my invention:

1. In a slide-changing mechanism for use in a photographic slide projector having an electric motor for driving the slide-changing mechanism, the motor being activated by a direct current power supply to change a slide and deactivated when a slide is being shown, and having an electric solenoid-operated positioning fork with the solenoid being energized to hold a slide in position when the motor is deactivated and the solenoid deenergized to release the slide when the motor is activated to change a slide, a timer circuit for said mechanism comprising:

a single-pole, double-throw switch having center, first and second contacts, said center contact being electrically connected to said second contact when the motor is deactivated and connected to said first contact after the motor is activated, said center contact being connected to the negative side of the power supply;

a silicon-controlled rectifier having an anode, a cathode and a gate electrode, said cathode being connected to said second contact of said switch and one side of the solenoid coil, said anode being connected to said first contact of said switch and to the negative terminal of the motor, and the other side of the solenoid coil and the positive terminal of the motor being connected to the positive side of the power supply; and a triggering circuit for said rectifier including a unijunction transistor having first and second bases and an emitter, a biasing circuit having a first resistor connected between the positive side of the power supply and said second base of said unijunction transistor and a second resistance connected between said first base of said unijunction transistor and the negative side of the power supply, said gate electrode of said rectifier being connected to said first base of said unijunction transistor, and a biasing circuit having third and fourth resistors connected in series between the positive side of the power supply and said emitter of said unijunction transistor and a capacitor connected between said emitter and the negative side of said power supply.

2. A timer circuit as defined in claim 1 including a holding circuit including a fifth resistor and a first diode connected in series between the positive side of the power supply and said anode of said rectifier for supplying a holding current through said rectifier after it is triggered.

3. A timer circuit as defined in claim 1 including a second diode connected between said first contact of said single-pole double-throw switch and said anode of said rectifier.

4. A timer circuit as defined in claim 3 including a holding circuit having a fifth resistor and a first diode connected in series between the positive side of the power supply and said anode of said rectifier to provide a holding current through said rectifier after it is triggered.

5. A timer circuit as defined in claim 1 wherein said third resistor in said timing circuit is variable.

6. In a slide-changing mechanism for use in a photographic slide projector having an electric motor for driving the mechanism, the motor being activated by a direct current power supply to change a slide and deactivated while a slide is being shown, a timer circuit comprising:

controlled switch means for activating the motor a predetermined time period after the motor is deactivated, said controlled switch means having a controlled rectifier connected between the power supply and the motor and triggering means connected to said rectifier for triggering said rectifier after said predetermined time period, said triggering means being connected to the power supply through a pair of power input terminals; and reset switch means connected to said controlled switch means for resetting said controlled switch means after the motor is activated and maintaining said controlled switch means in a reset condition until the motor is deactivated, said reset switch means disconnecting said rectifier from the power supply and the motor after the motor is activated, said reset switch means thereafter substantially short-circuiting the anode to cathode circuit of said rectifier and disconnecting the triggering means from the power supply and substantially short-circuiting the power input terminals of said triggering means to commutate said rectifier and reset said triggering means.

7. In a slide-changing mechanism for use in a photographic slide projector having an electric motor for driving the mechanism, the motor being activated by a direct current power supply to change a slide and deactivated while a slide is being shown, a timer circuit comprising:

controlled switch means for activating the motor a predetermined time period after the motor is deactivated, said controlled switch means having a controlled rectifier connected between the power supply and the motor and triggering means connected to said rectifier for triggering said rectifier after said predetermined time period, said triggering means being connected to the power supply through a pair of power input terminals, said triggering means having a unijunction transistor connected in a relaxation oscillator circuit, said oscillator circuit having a biasing network and a charging network connected to the power supply through a pair of power input terminals; and reset switch means connected to said controlled switch means for resetting said controlled switch means after the motor is activated and maintaining said controlled switch means in a reset condition until the motor is deactivated, said reset switch means disconnecting said rectifier from between the power supply and the motor after the motor is activated, said switch means thereafter substantially short-circuiting the anode to cathode circuit of said rectifier and disconnecting the relaxation oscillator from the power supply and substantially short-circuiting said power input terminals thereof to commutate said rectifier and reset said relaxation oscillator circuit to predetermined initial conditions.

8. A timer circuit as defined in claim 7 including:
an electrical impedance; and
wherein said reset switch means includes a single-pole double-throw switch having first and second outer contacts and a center contact being connected to said second contact when the motor is deactivated and connected to said first contact after the motor is activated, the center contact of said single-pole, double-throw switch being connected to the negative side of the power supply;
wherein the positive side of the power supply is commonly connected to one side of said electrical impedance, one of said power terminals of said relaxation oscillator circuit and the positive input terminal of the motor;
wherein said second contact of said single-pole, double-throw switch is commonly connected to the cathode of said controlled rectifier, the other power input terminal of relaxation oscillator circuit and the other side of said electrical impedance; and
wherein said first contact of said single-pole, double-throw switch is commonly connected to the negative terminal of the motor and the anode of said rectifier.

9. A timer circuit as defined in claim 8 wherein said electrical impedance is a solenoid coil.

* * * * *